United States Patent
Chinen et al.

(10) Patent No.: US 7,295,716 B1
(45) Date of Patent: Nov. 13, 2007

(54) METHOD AND APPARATUS FOR DIFFUSION BASED IMAGE RELIGHTING

(75) Inventors: Troy Chinen, Fremont, CA (US); Thomas Leung, San Jose, CA (US)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/477,941

(22) Filed: Jun. 30, 2006

(51) Int. Cl.
*G06K 9/40* (2006.01)

(52) U.S. Cl. .............. 382/274; 358/509; 345/77; 359/308

(58) Field of Classification Search ........... 382/254, 382/274; 358/509; 345/77; 359/308
See application file for complete search history.

(56) References Cited

U.S. PATENT DOCUMENTS

| | | | |
|---|---|---|---|
| 5,003,618 A * | 3/1991 | Meno ............... | 382/261 |
| 6,498,867 B1 * | 12/2002 | Potucek et al. ........ | 382/274 |
| 6,731,821 B1 * | 5/2004 | Maurer et al. ........ | 382/263 |
| 6,803,910 B2 * | 10/2004 | Pfister et al. ........ | 345/420 |
| 7,031,546 B2 * | 4/2006 | Maeda et al. ........ | 382/260 |
| 2005/0041883 A1 * | 2/2005 | Maurer et al. ........ | 382/260 |
| 2005/0078116 A1 * | 4/2005 | Sloan et al. ........ | 345/502 |
| 2006/0285769 A1 * | 12/2006 | Wang et al. ........ | 382/274 |
| 2007/0110294 A1 * | 5/2007 | Schaap et al. ........ | 382/131 |

OTHER PUBLICATIONS

Perona, Pietro et al., Scale-Space and Edge Detection Using Anisotropic Diffusion, (Jul. 1990, IEEE Transactions on Pattern Analysis and Machine Intelligence, vol. 12, No. 7, pp. 629-639.

* cited by examiner

*Primary Examiner*—Vikkram Bali
*Assistant Examiner*—Anand Bhatnagar
(74) *Attorney, Agent, or Firm*—Birch, Stewart, Kolasch & Birch, LLP

(57) ABSTRACT

A method for image relighting is presented which receives an input image having at least one spurious edge directly resulting from a first illumination present when the input image was acquired, performs anisotropic diffusion on the input image to form a diffusion image, removes the first illumination using the diffusion image to generate a reflectance image and applies a second illumination to the reflectance image. An apparatus for relighting is presented which includes a processor operably coupled to memory storing input image having a first illumination present when the input image was acquired, and functional processing including an anisotropic diffusion module to perform anisotropic diffusion on the input image to form a diffusion image, a combination module which removes the first illumination using the diffusion image to generate a reflectance image, a second illumination module which generates a second illumination, and a lighting application model which applies the second illumination.

40 Claims, 8 Drawing Sheets

METHOD AND APPARATUS FOR DIFFUSION BASED IMAGE RELIGHTING

BACKGROUND OF THE INVENTION

1. Field of the Invention

This invention relates to relighting digital images, and more particularly, to methods and apparatuses for using various types of diffusion processing for removing a first illumination from an image and reapplying a new illumination thereto.

2. Description of the Related Art

Images may contain variations in intensity which are introduced by the light source used to illuminate the subject and/or scene composing the image. These intensity variations may be undesirable as they can be visually distracting and reduce the aesthetic quality of an image. In order to improve the presentation of the image, it may be desirable to change the appearance of the illumination in the image. Changing the illumination is referred to herein as relighting.

The original unwanted illumination may manifest itself in the form of edge artifacts, which are referred to herein as spurious edges. Spurious edges can be distracting because they can mask real edges in the image, where real edges, which are the result of the underling structure of the subject or scene within the image, contain information typically of most interest to image users. Spurious edges, as well as other undesirable illumination variations, can be removed and changed through image relighting techniques.

One approach to remove the original illumination can be accomplished with illumination normalization techniques. Conventional illumination normalization techniques include level compression techniques to mitigate the appearance of illumination variations. Some level compression techniques use logarithmic functions to compress the dynamic range of the image, thus reducing the perception illumination gradients. Other techniques may use statistical approaches such as histogram stretching or equalization. Histogram approaches may seek to alter the intensity distribution of the image to improve overall contrast and reduce the effect of unwanted variations in intensity due to illumination. However, such conventional techniques may have difficulty compensating for sharp spurious edges, and may further cause other global variations in intensity which may be undesirable.

If the original illumination is not properly removed, then the application of a new illumination to relight the image may not appear natural, and thus be less desirable. Accordingly, there is a need for approaches to effectively remove an old illumination from the image so another illumination can be applied to perform image relighting.

SUMMARY OF THE INVENTION

Embodiments consistent with the present invention are directed to methods and apparatuses for image relighting. One embodiment consistent with the invention is a method for performing relighting on a digital image which includes receiving an input image having at least one spurious edge directly resulting from a first illumination present when the input image was acquired, performing anisotropic diffusion on the input image to form a diffusion image, removing the first illumination using the diffusion image to generate a reflectance image, and applying a second illumination to the reflectance image.

Another embodiment consistent with the present invention is an apparatus for performing relighting on a digital image which includes a processor operably coupled to memory storing input image data having at least one spurious edge directly resulting from a first illumination present when the input image was acquired, and functional processing units for controlling image processing, wherein the functional processing units include an anisotropic diffusion module to perform anisotropic diffusion on the input image to form a diffusion image, a combination module which removes the first illumination using the diffusion image to generate a reflectance image, a second illumination module which generates a second illumination, and a lighting application model which applies the second illumination.

Another embodiment consistent with the present invention is an apparatus for performing relighting on a digital image which includes a processor operably coupled to memory storing input image data which contains an object of interest and having at least one spurious edge directly resulting from a first illumination present when the input image was acquired, a model of a representative object of interest, and functional processing units for controlling image processing, wherein the functional processing units include a model generation module a model based anisotropic diffusion module which predicts edge information regarding the object of interest utilizing the model, and removes the first illumination to produce a reflectance image, a second illumination module which generates a second illumination, and a lighting application model which applies the second illumination.

BRIEF DESCRIPTION OF THE DRAWINGS

Further aspects and advantages of the present invention will become apparent upon reading the following detailed description taken in conjunction with the accompanying drawings, in which.

DETAILED DESCRIPTION

Aspects of the invention are more specifically set forth in the following description with reference to the appended figures. Although the detailed embodiments described below relate to face recognition or verification, principles of the present invention described herein may also be applied to different object types appearing in digital images.

Generally speaking, an input image I(x,y) may be conceptualized as the product of a reflectance image R(x,y) and lighting image L(x,y); mathematically speaking, I(x,y)=R(x,y)*L(x,y), where (*) denotes a pixel-by-pixel product of two images. The reflectance image may be illumination invariant, and contrast variations, textures, real edges, etc. may be caused by the underling structure of the contents and/or objects (e.g., faces) represented within the image. The lighting image L(x,y) may be the result of contrast variations, such as, for example, spurious edges, resulting from the illumination of the contents and/or objects. For example, if a strong light source was placed in a specific location next to a face during the acquisition of an image, spurious edges may appear in the image as a function of the location of the strong light source. Real edges (represented by reflectance R(x,y)), resulting from structural facial features such as the eyes, nose, mouth, etc., also appear intermixed with the spurious edges.

When performing image relighting, the first step may be to remove the old illumination, and the second step may be to apply a new illumination. The reflectance image R(x,y) may effectively have the lighting removed, as edges therein may only be due to structural variations of the object(s) in the image. The reflectance R(x,y) image may be the provided by illumination normalization process in a variety of ways using diffusion processing. In one embodiment, diffusion techniques, including model-based anisotropic diffusion (described further below) can be used to estimate the reflectance R(x,y) indirectly. Other embodiments can include using model based anisotropic diffusion to estimate the reflectance R(x,y) directly. Once the reflectance is determined, it may have another lighting applied in a variety of ways to accomplish the image relighting.

Image Relighting

Figure 1:
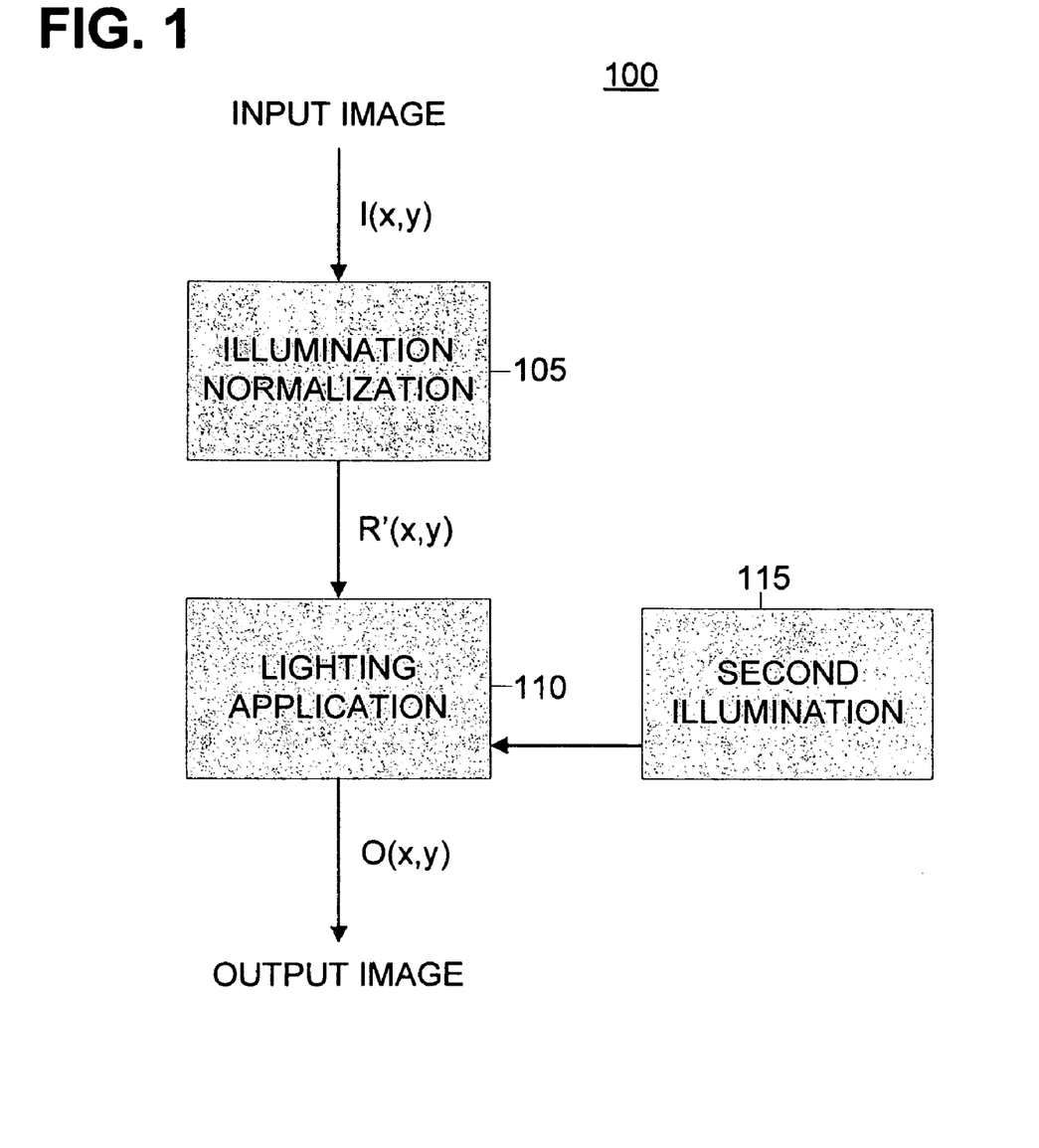
FIG. 1 depicts an exemplary flowchart for image relighting consistent with an embodiment of the present invention.

FIG. 1 illustrates a flowchart for performing image relighting consistent with an embodiment of the invention. Relighting process 100 includes image normalization 105, second illumination 115, and lighting application 110.

An input image I(x,y) is initially provided to illumination normalization 105. The input image is provided which may be a digital image obtained from any known image acquisition device, including, for example, a digital camera, a scanner, etc. The input image may also be an image created through any known synthetic techniques, such as computer generated animation, or may be a combination of digital data which is acquired via a sensor and synthetically generated.

The input image contains an old illumination which may be removed by illumination normalization 105. The illumination normalization provides a reflectance estimate R'(x,y), which is illumination invariant and may only have edges resulting from underlying structure within the image. The reflectance estimate R'(x,y) is then passed onto lighting application 110. Lighting application 110 combines the reflectance estimate R'(x,y) with a new illumination, referred to herein as second illumination 115. Lighting application 110 may perform the combination by multiplying and/or adding the reflectance estimate R'(x,y) by second illumination 115. Other ways known to one of ordinary skill in the art of combing the reflectance estimate R'(x,y) and second illumination 115 may also be used. Once the second illumination 115 has been applied, the result is output image O(x,y) which has the old illumination removed and the new (second) illumination applied.

Second illumination 115 can provide the new illumination and may be generated synthetically or may be derived from another image. Synthetically generated illuminations may be two-dimensional images which have desired illumination variations which could be mathematically generated, such as, for example, an illumination gradient or use any other illumination techniques known in the art. Synthetically generated illuminations could also be used in conjunction with three-dimensional models. These models could provide additional information and be correlated to objects within the image being illuminated. For example, a three-dimensional model of a face could be used when applying a new synthetically derived illumination in order to properly model shadows of facial features. Such techniques may also utilize models specifying the location of the illumination source in three-dimensional space, which are known in the art. When generating the second illumination, any synthetically generated illumination techniques known to those of ordinary skill in the art may be used.

As mentioned above, second illumination 115 can also be derived from another image. This derivation can be accomplished using diffusion techniques to provide a lighting estimate L'(x,y) taken from another image. (Techniques for estimating determining the lighting estimate L'(x,y) are presented in detail below.) This technique may have the advantage of providing shadow information without having to generate three-dimensional models of objects within the image. For example, if a first image of a face had a desirable illumination, but the subject's eyes were closed, the illumination could be removed from the first image, and applied to a second image wherein the subject's eye's were open. The applied illumination could contain shadows and other lighting cues since it was derived from another image. If these two images did not line up geometrically, the could be geometrically normalized to account for such variations. Geometrical normalization is discussed below.

The next paragraphs discuss techniques using diffusion techniques, including model-based anisotropic diffusion, to obtain reflection estimate R'(x,y) and lighting estimate L'(x, y).

Indirect Reflectance Estimation using Conventional Anisotropic Diffusion

Figure 2:
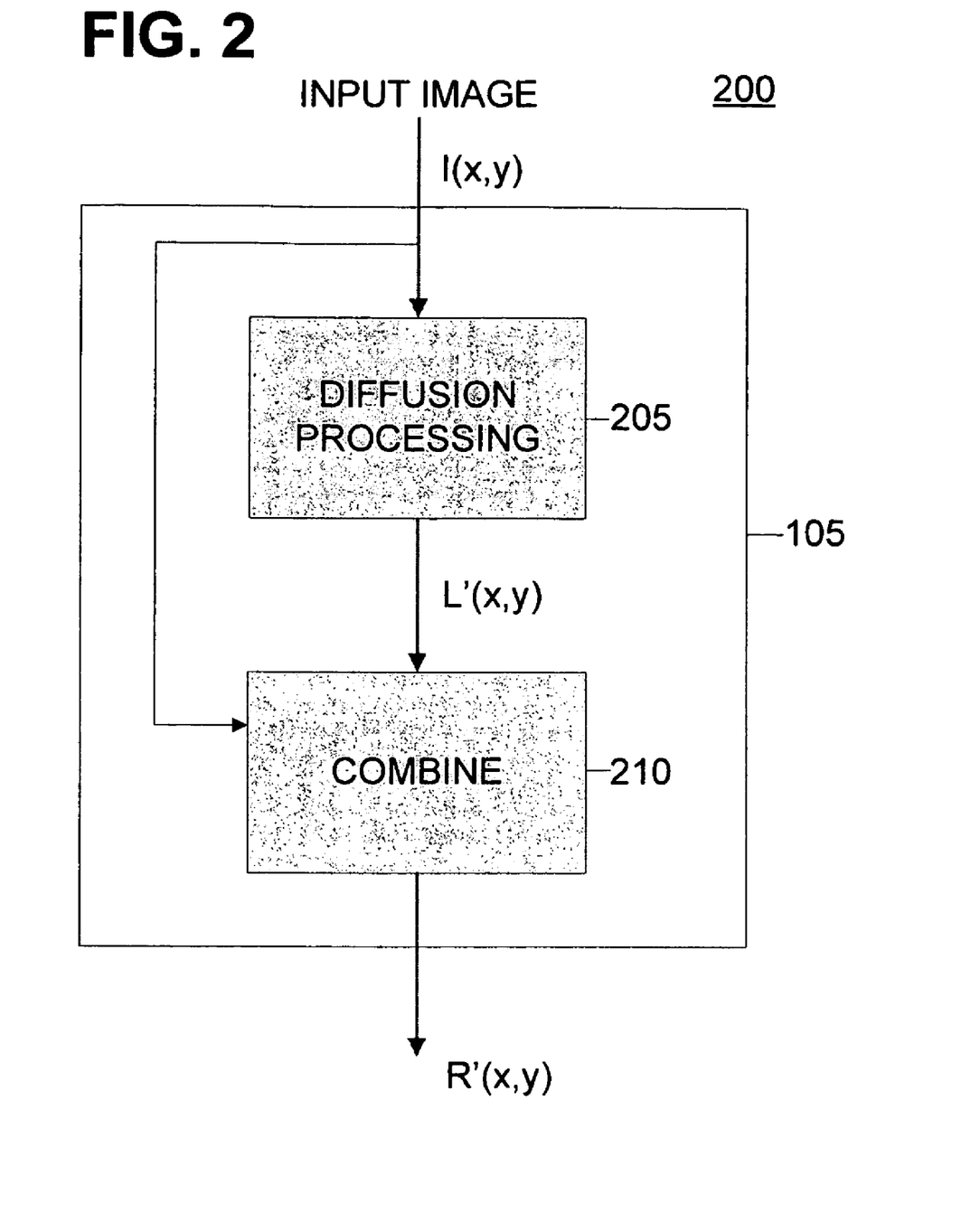
FIG. 2 illustrates an exemplary flowchart for diffusion based illumination normalization consistent with an embodiment of the present invention.

FIG. 2 depicts an exemplary flowchart for illumination normalization process 200 which estimates the reflectance model R(x,y) indirectly. Illumination normalization process 200 includes a diffusion step 205 and a combine step 210. Diffusion processing is initially performed on the input image. Diffusion processing could be any general diffusion processing algorithm known in the art, and may include conventional anisotropic diffusion. Conventional anisotropic diffusion (AD) techniques may be used for edge-preserving noise reduction in digital image data. AD algorithms may remove noise from an image by modifying the image through the application of partial differential equations. This modification typically involves the iterative application of a filtering operator which varies as a function of edge information detected within the image. The location of such edges may be determined utilizing conventional edge detectors such as, for example, those employing gradient functions. In practice, Gaussian filters may provide a reliable way to perform the gradient operations when used conjunction with, for example, a Laplace operator; as well as performing the noise reduction filtering operations.

Implementation of the AD algorithm can be viewed as solving the diffusion differential equation via iterative numerical differential equation solvers, wherein each iteration over the image corresponds to a time step. For each iteration, the scale of a Gaussian filter may be altered, and a gradient function is used to determine whether an edge locally exists within the image. If it is determined that an edge exists, Gaussian filtering may not be performed in order to preserve the edge. If no edge is detected, the area may be filtered to reduce noise. These operations are performed for each iteration, and the local result is combined with the image.

In this embodiment, diffusion 205 can produce a diffusion image which may be an estimate of the illumination, L'(x,y). Parameters, such as, for example, the filter coefficients (or weights), may be selected so diffusion 205 creates an edge preserved, smoothed version of the input image I(x,y). L'(x,y) may have large, strong edges preserved which correspond to spurious edges due to illumination. The illumination estimate L'(x,y) and the input image I(x,y) may then be processed together in combine step 210. Combine step 210 may include simply dividing the illumination estimate L'(x,y) into the input image I(x,y) to determine a reflectance estimate image R'(x,y); that is, R'(x,y)=I(x,y)/L'(x,y). In other embodiments, the reflectance estimate R'(x,y) may be determined by subtraction: R'(x,y)=I(x,y)−L'(x,y). Other known image processing techniques, such as filtering, scaling, non-linear intensity mapping, could be performed in combine step 210 to enhance the reflectance estimate R'(x,y). One of ordinary skill in the art would appreciate that various other ways of combining L'(x,y) and I(x,y) could be utilized to estimate the reflectance R'(x,y). In generating the reflectance estimate R'(x,y), combine step 210 produces the output image which may have had the spurious edges removed and the real edges ideally left unaltered, thus producing an illumination normalized image. Note that L'(x,y), generated from another image which has a desired illumination, may be used to create second illumination 115, as described above.

Indirect Reflectance Estimation using Model Based Anisotropic Diffusion

When illumination normalization is performed using conventional anisotropic diffusion, real edges, which may be due to object structure, can be mistaken as spurious edges which may be the result of illumination variations. This inability of conventional anisotropic diffusion to distinguish between real and spurious edges may result in a loss of desirable information within the processed image. Model based anisotropic diffusion (MBAD) illumination normalization can differentiate between edges caused by the object represented in the image and edges due to some other effect such as illumination variations.

Figure 3:
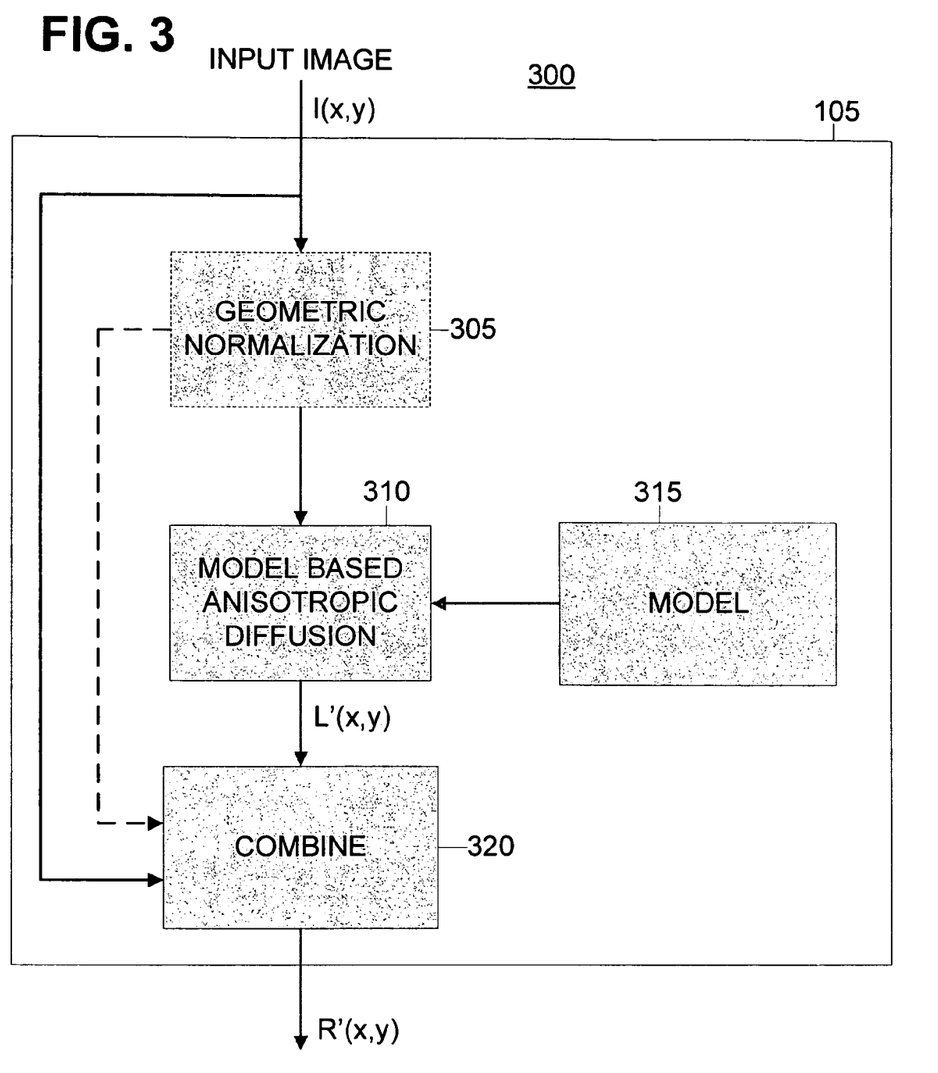
FIG. 3 shows an exemplary flowchart for illumination normalization utilizing model-based anisotropic diffusion consistent with the another embodiment of the invention.

FIG. 3 shows an exemplary flow diagram of an MBAD illumination normalization embodiment 300 which estimates the reflectance R'(x,y) indirectly. MBAD illumination normalization 300 may include optional geometric normalization 305, model based anisotropic diffusion 310, model 315, combine step 320. The input image I(x,y) may optionally first undergo geometric normalization 305, shown in FIG. 3, using dashed lines to indicate that it is an optional process. Geometric normalization 305 can process the input image so it has a greater degree of compatibility with model 315. Geometric normalization may register the input image with model 315 to improve the overall performance of image processing method 300. The registration may be performed using any registration techniques known in the art, and can further include rotation, scaling, warping, cropping, and/or translation of the of the input image, or any combination thereof. Registration can allow the input image to be transformed into canonical form so that objects represented therein may be associated with representative objects in model 315. As stated above, geometric normalization 305 is optional, and its use may depend upon the object being modeled. For example, if the model was being used to represent the edges of a human face, geometric normalization 305 may typically be performed.

Generally speaking, model 315 may provide additional information regarding an object of interest which cannot be determined from the input image itself. In one embodiment, model 315 can provide information regarding edges within a representative object, which may include the location and likelihood of real edges within the representative object. As used herein, the term "real edges" may be defined as localized contrast variations (i.e. an edge) within an image which solely result from features associated with an object. The real edges typically may not be caused by other effects external to the object, such as environmental phenomena or sensor artifacts. For example, as described in more detail below, if the representative object in model 315 is a face, real edges indicated in the model may be the result of the structural variations in the features naturally occurring in a face, such as, for example, the eyes, nose, mouth, etc. Other representative objects may be generated depending upon what artifacts need to be removed in the input image and the input image's contents.

Model 315 may be represented using a variety of different methods. One representation may include a multi-dimensional mathematical function which indicates the probability of an edge as a function of pixel position within the input image. The mathematical function could be determined using regression or other modeling techniques. Model 315 may also be represented by a two-dimensional dataset, having a structure like an image or a surface, where pixel indices in the horizontal and vertical directions represent location, and pixel values represent the probability of a real edge. The values pixel values may take on values between 0 and 1. Details regarding one embodiment for creating a model are presented in further detail below in the description of FIG. 6. Model 315 provides real edge information to model based anisotropic diffusion 310.

Model based anisotropic diffusion 310 may perform the well known anisotropic diffusion process while utilizing real edge information supplied by model 315. While embodiments herein so far have described using anisotropic diffusion, other embodiments of the invention may contemplate other types of diffusion processes, which are known in the art, that could benefit from the information supplied by model 315.

Like standard diffusion algorithms, model based anisotropic diffusion (MBAD) 310 may iteratively perform noise reduction filtering over successive time periods, and use gradient information to determine whether or not an edge exists underneath a filter kernel for a given iteration. However, to improve the edge detection process, MBAD 310 can utilize information from model 315 to determine if an edge underling the filter kernel is a real edge. This information may be utilized during each iteration in the diffusion process, therefore this embodiment of MBAD 310 can modify the internal operations of the algorithm. These modifications can be implemented in a variety of ways. For example, model information 315 may be used to determine whether or not to apply filtering. In another example, model 315 information may be used to alter the filtering parameters, such as, for example, the filter weights, which is described in more detail below in FIG. 4. In this embodiment, the output of MBAD 310 may be an considered an illumination estimate L'(x,y), while preserving real edge information originally present in the input image of the object. Note that when input image contains a desired illumination, L'(x,y) can be used for second illumination 115 as discussed above.

Once the illumination estimate L'(x,y) is determined, the illumination estimate L'(x,y) may be combined with the input image I(x,y) in combine step 320, if no geometric normalization 305 was performed. If the geometric normalization was performed, combine step 320 would combine the geometrically normalized image with the illumination estimate L'(x,y). As described in the embodiment shown in FIG. 2, combine step 320 may include simply dividing the illumination estimate L'(x,y) into the input image I(x,y) to determine a reflectance estimate image R'(x,y). In other embodiments, the reflectance estimate R'(x,y) may be determined by subtraction: R'(x,y)=I(x,y)−L'(x.y). Other known image processing techniques, such as filtering, scaling, non-linear intensity mapping, could be performed in combine step 320 to enhance the reflectance estimate R'(x,y). One of ordinary skill in the art would appreciate that various other ways of combining L'(x,y) and I(x,y) could be utilized to estimate the reflectance R'(x,y).

In generating the reflectance estimate R'(x,y), combine step 320 produces the output image which may have had the spurious edges removed, and the real edges ideally left unaltered, thus producing an illumination normalized image. This embodiment may improve the quality of the estimate R'(x,y) because it utilizes the additional real edge information provided by model 315.

Figure 4:
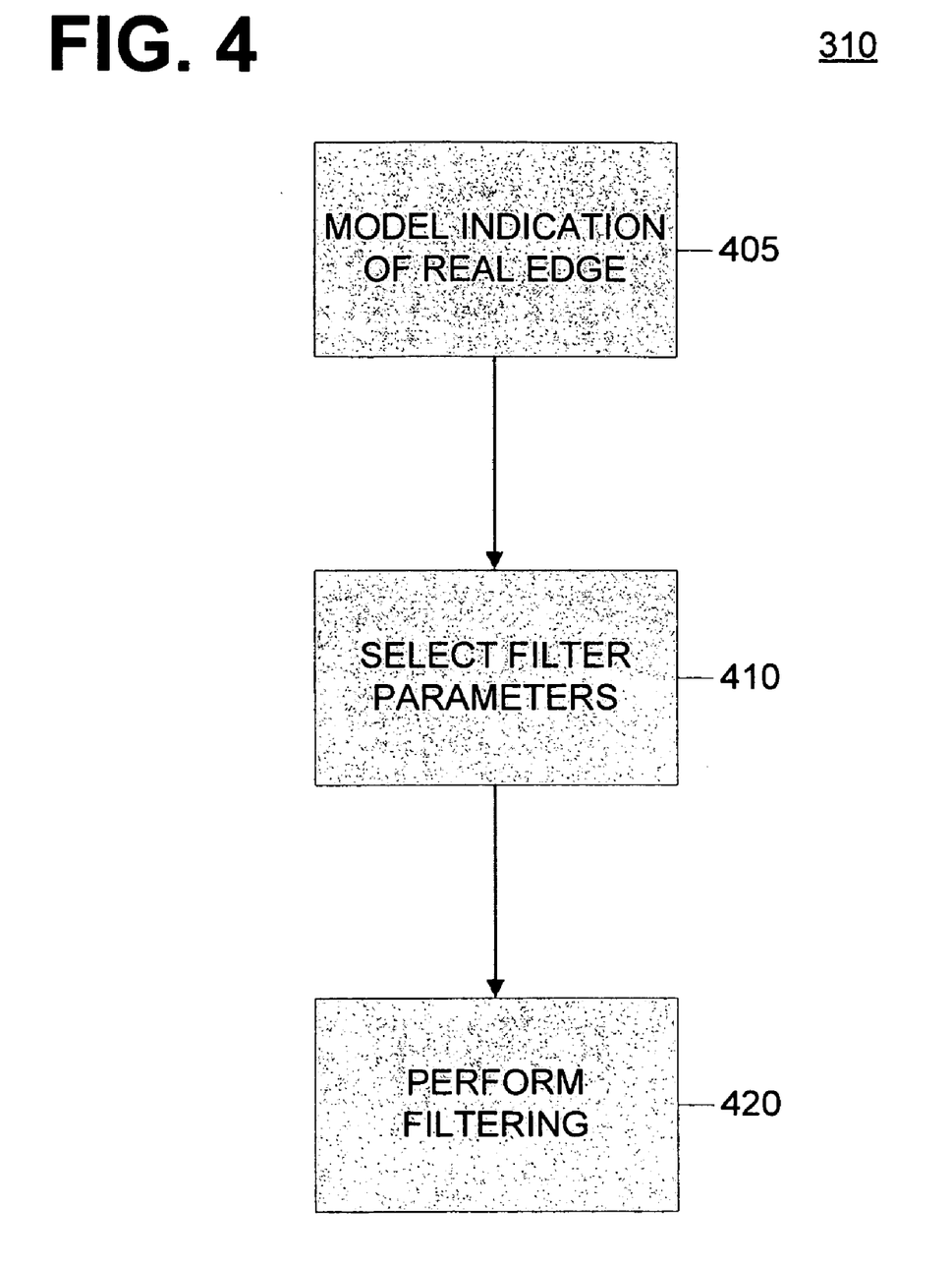
FIG. 4 shows an exemplary flowchart providing further detail for the embodiment described in FIG. 3.

FIG. 4 shows a more detailed exemplary flowchart for model-based anisotropic diffusion 310 consistent with the embodiment shown in FIG. 3. FIG. 4 details an embodiment of MBAD 310 whereby the filter coefficients are modified on the basis of real edge information provided by model 315. Here, a model 315 may provide an indication of a real edge in step 405. On the basis of this information, MBAD 310 may select filter parameters in step 410. Typically, if a real edge is indicated, less filtering may be performed in order to preserve the edge. If no real edge is indicated, the more filtering may be performed to better reduce noise.

The filter parameters may be selected in a variety of different ways in step 415. In one embodiment, the actual size of the filter kernel could be varied. If the probability of an edge is indicated as high, the size of the filter kernel could be reduced, thus reducing the noise filtering effects. If the probability of a real edge is low, the size of the filter kernel could be increased to better reduce noise. In another embodiment, the values of the filter coefficients themselves may be changed based upon the value of the probability of a real edge. These values could be determined by a look-up table based upon real-edge probabilities, or they could be determined by a mathematical function known to one of ordinary skill in the art. In a simple embodiment, one may adjust the filter parameters so no filtering is performed when the probability of a real edge exceeds a threshold value. Once the filter parameters are determined, the image may be filtered in step 420 using the selected parameters. The filtering may be standard convolutional filtering, or any other filtering known to one of ordinary skill in the art.

The real edge information provided by model 315 may be solely used in selecting filter parameters, or this information may be combined with the gradient edge information typically provided by the anisotropic diffusion process. How these two types of information may be combined may be based upon by the level of confidence in the model of the representative object itself, and/or information regarding the conditions from which the input image was collected.

Figure 5:
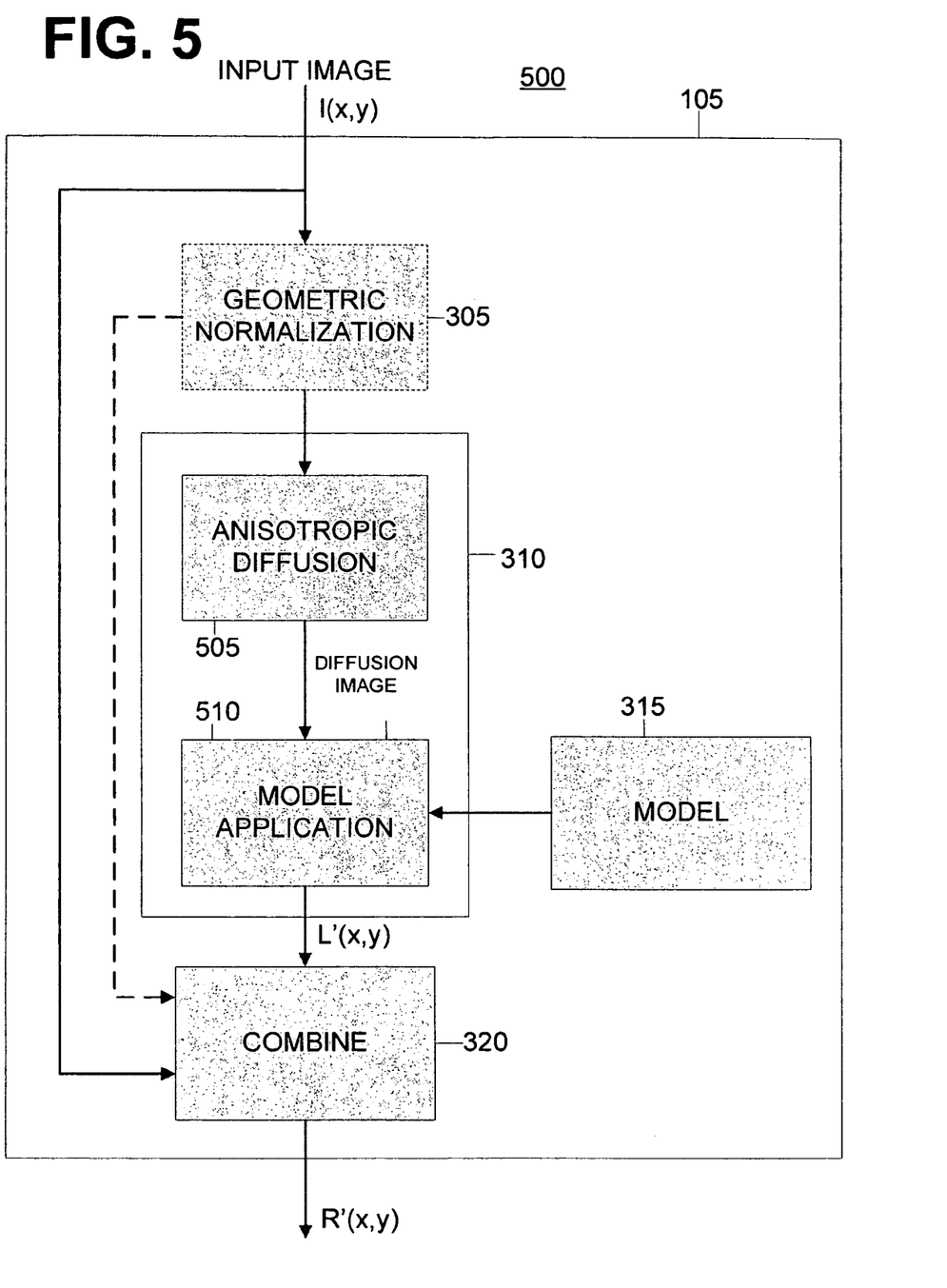
FIG. 5 depicts provides another exemplary flowchart for illumination normalization using model-based anisotropic diffusion consistent with yet another embodiment of the present invention.

FIG. 5 depicts provides another exemplary flowchart for illumination normalization 500 using MBAD consistent with yet another embodiment of the present invention. MBAD based illumination normalization 500 includes optional geometric normalization 305, anisotropic diffusion 505, model 315, model application 510, and combine step 320.

An input image may first undergo an optional geometric normalization step 305, which may be the same process described above in illumination normalization 300 shown in FIG. 3. This embodiment differs from illumination normalization 300 in that MBAD 310 is broken down into two components, the first is a conventional anisotropic diffusion process 505, and the second is a model application process 510. This embodiment differs from the embodiment shown in FIG. 3 in that information from model 315 may not be directly applied during anisotropic diffusion 505, but may be applied after the input image has undergone anisotropic diffusion, for which the result is referred to as a diffusion image. The model information, provided by model 315, is combined with the diffusion image in model application step 510. Model 315 may be the same model discussed above for the embodiment shown in FIG. 3. Anisotropic diffusion 505 may utilize any conventional anisotropic diffusion process known in the art, or for that matter, use any form of known diffusion algorithm.

Model 315 supplies real edge information to model application 510. This information may be combined with the diffusion image and the input image to improve the filtering process. In one embodiment, the diffusion image and the input image may be combined using a simple linear combination, wherein values from model 315 provide weights. The resultant linear combination produces an illumination estimate L'(x,y). The linear combination may be mathematically described by following equation:

$$L'(x,y)=I(x,y)[1-M(x,y)]+D(x,y)M(x,y)$$

where
L'(x,y): illumination estimate;
I(x,y): input image
D(x,y): diffusion image; and
M(x,y): model values.

So for example, in areas of the input image where the edge probability is low, M(x,y) may take on values close to zero. In these areas, illumination estimate L'(x,y) will be similar to the input image I(x,y). As in the other embodiments, another image with a desired lighting may be used to generate an illumination estimate L'(x,y) which can be applied as second illumination 115.

As in illumination normalization embodiment 300 shown in FIG. 3, once the illumination estimate L'(x,y) is determined, it may be combined with the input image I(x,y) in combination step 320. If geometric normalization 305 is performed, the output of geometric normalization step 305 may be combined with the illumination estimate L'(x,y). The combine step 320 may operate in the same manner as provided above in the description of FIG. 3. The output image of combine step 320 is the reflectance estimate R'(x,y).

Figure 6:
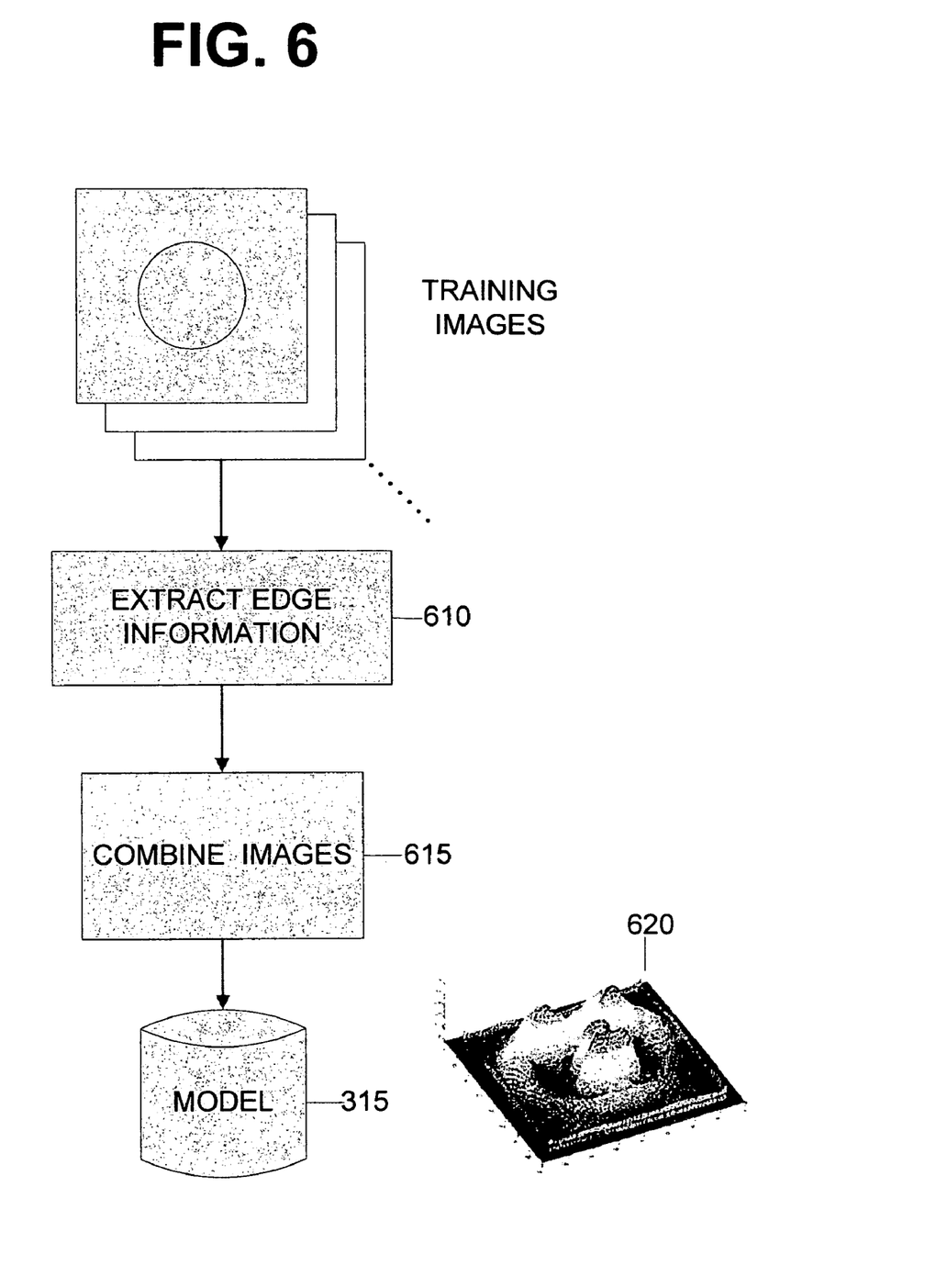
FIG. 6 illustrates an exemplary flowchart for model generation consistent with yet another embodiment of the present invention.

FIG. 6 illustrates an exemplary flowchart for model generation consistent with yet another embodiment of the present invention. Model 315 may be created by using a set of training images which each contain a representative object of interest. Each training image may be optionally processed with a geometric normalization process similar to the one described above, to ensure each object is a canonical reference (not shown). Next, edge information is extracted from each image in step 610. The edge information may be extracted using any known edge detector, such as, for example, a Sobel edge detector. Once the edge information is extracted from each of the training images, the images may be combined in step 615. The combination may include summing the images together and performing subsequent low pass filtering using a Gaussian kernel. The summing and filtering allows illumination and other variations which occur in each individual training image to be averaged out, reducing spurious edges, and reinforcing real edges corresponding to the representative object. The filtered image may then have a non-linear function applied, such as, for example, a gamma correction, which is known in the art. Further processing may also convert combined image into a probability lying between 0 and 1. The final output is the model 315 which may take the form of a multi-dimensional dataset. In one embodiment, the training images contained faces as the representative object, and created a model providing information relating to real edges within a face. A surface plot 620 of this model is shown in FIG. 6, where peaks can be seen which correspond to facial features. In other embodiments, other meta information could be added to model 315 to improve accuracy. The meta information may include information regarding the sensors which collected the training images, or other information know to one of ordinary skill in the art, such as, for example, the fact that there should be no albedo changes on the nose of a face. Other embodiments may allow the model to take the form of a mathematical function instead of a multi-dimensional dataset.

Direct Reflectance Estimation using Model-Based Anisotropic Diffusion

Figure 7:
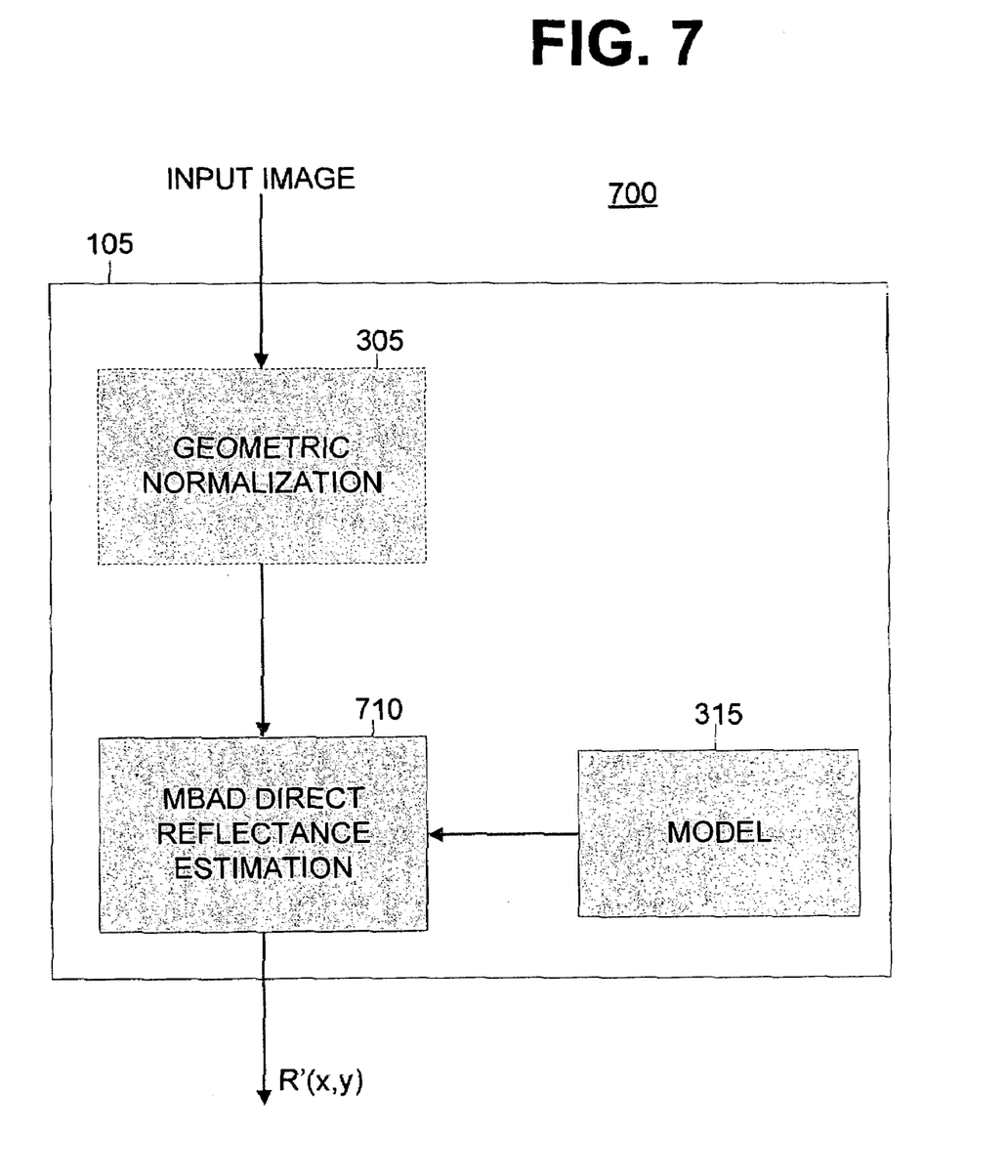
FIG. 7 shows an exemplary flow diagram for an embodiment having a direct reflectance estimation illumination normalization which is consistent with the present invention.

FIG. 7 shows an exemplary flow diagram for another illumination normalization embodiment 700 consistent with the present invention. Direct reflectance estimation (DRE) illumination normalization 700 may include an optional geometric normalization step 305, MBAD direct reflectance estimation step 710, and model 315.

As described in the embodiment shown in FIGS. 3 and 5, geometric normalization is optional and used if the input image should be registered to the model 315. Both geometric normalization 305 and model 315 may operate as described above in FIGS. 3 and 5. MBAD direct reflectance estimation step can outputs the reflectance estimate R'(x,y) without having to perform the combine step described above in FIGS. 3 and 5. In this embodiment, the MBAD parameters are selected so that more filtering is performed in areas which correspond to spurious edges, thus significantly blurring out illumination edges, and leaving real edges corresponding real features on the object in the image, the locations of which are estimated by model 315.

The selected parameters within MBAD direct reflectance estimation 710 may be the parameters which control the filtering. One way to increase the amount of filtering to increase the filter size that is used for the spurious edges. Another way to increase the amount of filtering would be to alter the filter coefficients so that the filter cutoff point is reduced in frequency, thus narrowing the pass band of the low-pass Gaussian filter.

Apparatus for Direct or Indirect Reflectance Estimation

Figure 8:
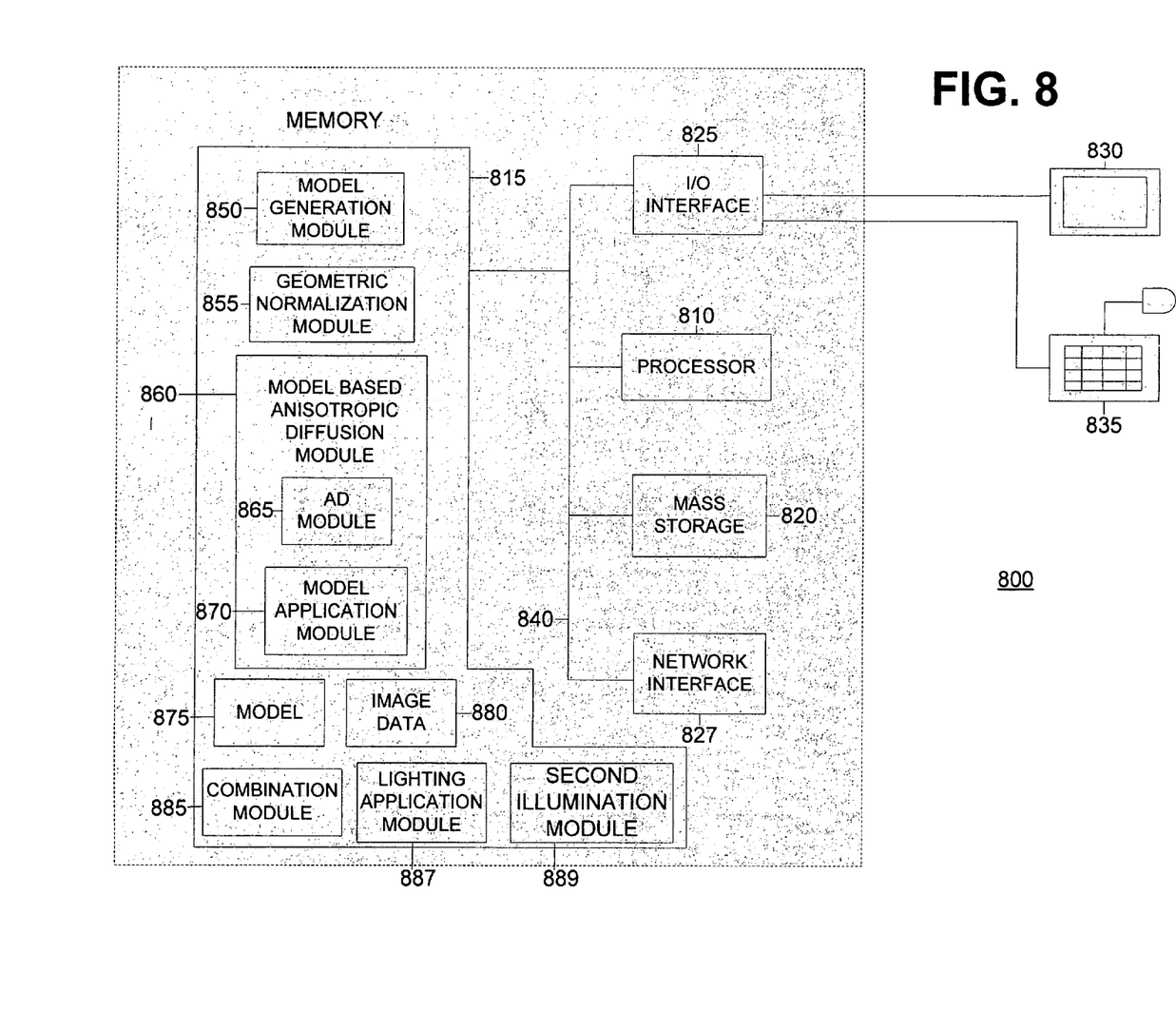
FIG. 8 shows an exemplary apparatus consistent with another embodiment of the present invention.

FIG. 8 shows an exemplary processing apparatus 800 consistent with another embodiment of the present invention. Processing apparatus 800 may include at least one processor 810, a memory 815, a mass storage device 820, an I/O interface 825, a network interface 827, an output display 830, and a user interface 835. Note that processing apparatus 800 can be any data processing equipment known to one of ordinary skill in the art, such as, for example, workstations, personal computers, special purpose computational hardware, special purpose digital image processors, and/or embedded processors. Processor 810 can execute instructions and perform calculations on image data based upon program instructions. Modules containing executable instructions, and digital image data, can be stored wholly or partially in memory 815, and transferred to processor 810 over a data bus 840. Memory 815 may contain a model generation module 850 to generate model 315, a geometric normalization module 855 to perform optional geometric normalization 305, a model based anisotropic diffusion module 860 to perform MBAD 310 which is performed in the model based anisotropic diffusion step 310 shown in FIG. 3. Alternatively, this module could contain a conventional anisotropic diffusion module 865 and a model application module 870 which perform of the anisotropic diffusion step 505 and the model application step 510 provided in the embodiment shown in FIG. 5. Memory 815 also may contain combination module 885 which may perform the combine steps 320 described in FIG. 3 and FIG. 5. Memory 815 may further contain the model module 875 containing the model 315, and image data 880, which could include the input image data, output image data (reflectance estimate R'(x,y)), diffusion image data (illumination estimate L'(x, y)), and/or the training image data. Memory 815 may further contain lighting application module 887 to combine the second illumination 115 and the reflectance estimate R'(x,y), and second illumination module 889 which provides the second illumination 115. Note that the second illumination may be provided synthetically, or can be derived from an estimated lighting L'(x,y) of another image processed through model based anisotropic diffusion module, 860 and/or AD module 865.

Mass storage 820 can also store program instructions and digital data, and communicate to processor 810 over data bus 840. Processing system can provide and receive other information through I/O interface 825 and network interface 827, to provide information to users on display 830, and receive user commands and/or data through user I/O interface 835.

Although detailed embodiments and implementations of the present invention have been described above, it should be apparent that various modifications are possible without departing from the spirit and scope of the present invention.

We claim:

1. A method for performing relighting on a digital image, comprising:
   receiving an input image having at least one spurious edge directly resulting from a first illumination present when the input image was acquired;
   performing anisotropic diffusion on the input image to form a diffusion image;
   removing the first illumination using the diffusion image to generate a reflectance image; and
   applying a second illumination to the reflectance image.

2. The method according to claim 1, wherein the applying further comprises multiplying or adding the second illumination to the reflectance image.

3. The method according to claim 1, wherein the second illumination is synthetically generated.

4. The method according to claim 3, wherein the second illumination is applied in utilizing a three-dimensional model.

5. The method according to claim 4, wherein the three-dimensional model is a model of a face.

6. The method according to claim 2, wherein the second illumination is extracted from another digital image.

7. The method according to claim 1, wherein the removing further comprises:
combining the input image and the diffusion image.

8. The method according to claim 7, wherein the combining comprises one of dividing the diffusion image into the input image, and subtracting the diffusion image from the input image.

9. The method according to claim 1, wherein the input image contains an object of interest, and the performing anisotropic diffusion further comprises:
providing a model of a representative object of interest;
predicting edge information regarding the object of interest based upon the model; and
performing anisotropic diffusion on the input image utilizing the predicted edge information.

10. The method according to claim 9, wherein the removing further comprises:
selecting anisotropic diffusion parameters to produce a reflectance estimation using only the diffusion image.

11. The method according to 10, wherein the parameters are selected so that filtering is performed, utilizing the model's predicted edge information, whereby spurious edges are removed while leaving edges resulting from structures associated with the object of interest.

12. The method according to claim 9, further comprising:
modifying filter weighting coefficients used during the performing anisotropic diffusion based upon the predicted edge information.

13. The method according to claim 9, further comprising:
modifying the filter kernel size used during the performing anisotropic diffusion based upon the predicted edge information.

14. The method according to claim 9, further comprising:
performing anisotropic diffusion directly on the input image to form a non-model based diffusion image; and
performing a linear combination of the input image and the non-model based diffusion image, wherein coefficients used in the linear combination are based upon the edge information.

15. The method according to claim 9, further comprising:
generating a model which is based upon a plurality of training images each containing an object of interest.

16. The method according to claim 15, further comprising:
converting each training image into a dataset wherein each value represents a probability of a real edge within the object; and
combining the datasets to form the model.

17. The method according to claim 16, wherein the generating further comprises:
performing an edge detection operation on each image;
registering each edge detected image to a common reference;
generating a composite image by adding, pixel-by-pixel, the registered images; and
normalizing the intensity of the composite image.

18. The method according to claim 9, further comprising:
performing geometric normalization on the digital image data to register the object of interest with the model.

19. The method according to claim 18, wherein the geometric normalization includes at least one of rotating, scaling, warping, and translating.

20. The method according to claim 9, wherein the object of interest is a face.

21. An apparatus for performing relighting on a digital image, comprising:

a processor operably coupled to memory storing input image data having at least one spurious edge directly resulting from a first illumination present when the input image was acquired, and functional processing units for controlling image processing, wherein the functional processing units comprise:
an anisotropic diffusion module to perform anisotropic diffusion on the input image to form a diffusion image;
a combination module which removes the first illumination using the diffusion image to generate a reflectance image;
a second illumination module which generates a second illumination; and
a lighting application model which applies the second illumination.

22. The apparatus according to claim 21, wherein the lighting application model performs multiplying or adding the second illumination to the reflectance image.

23. The apparatus according to claim 21, wherein the second illumination module utilizes a synthetically generated illumination.

24. The apparatus according to claim 23, wherein the second illumination module utilizes an illumination extracted from another digital image.

25. The apparatus according to claim 23, wherein the second illumination module utilizes a three-dimensional model.

26. The apparatus according to claim 25, wherein the three-dimensional model is a model of a face.

27. The apparatus according to claim 21, wherein the combination module performs one of dividing the diffusion image into the input image, and subtracting the diffusion image from the input image.

28. The apparatus according to claim 21, wherein the memory stores an input image which contains an object of interest, a model of a representative object of interest, and functional processing units which further comprise:
a model generation module; and
a model based anisotropic diffusion module which predicts edge information regarding the object of interest based upon the model, and performs anisotropic diffusion on the input image utilizing the predicted edge information.

29. The apparatus according to claim 28, wherein the model based anisotropic diffusion module modifies filter weighting coefficients based upon the edge information provided by the model.

30. The apparatus according to claim 29, wherein the model based anisotropic diffusion module modifies the filter kernel size based upon the edge information provided by the model.

31. The apparatus according to claim 28, wherein the model-based anisotropic diffusion module further comprises:
an anisotropic diffusion module which performs anisotropic diffusion on the input image; and
a model application module which performs a linear combination of the digital image data and anisotropic diffusion image, wherein coefficients used in the linear combination are based upon the edge information.

32. The apparatus according to claim 28, wherein the model generation module generates the model based upon a plurality of training images, each containing an object of interest.

33. The apparatus according to claim 32, wherein the model generation module converts each training image into a dataset wherein each value represents a probability of a real edge within the object, and combines the datasets to form the model.

34. The apparatus according to claim 32, wherein the model generation module utilizes information external to the plurality of training images.

35. The apparatus according to claim 32, wherein the model generation module performs an edge detection operation on each image, registers each edge detected image to a common reference, generates a composite image by adding, pixel-by-pixel, the registered images, and normalizes the intensity of the composite image.

36. The apparatus according to claim 28, further comprising:
- a geometric normalization module which performs geometric normalization on the digital image data to register the object of interest with the model.

37. The apparatus according to claim 36, wherein the geometric normalization module performs at least one of rotating, scaling, warping, and translating.

38. The apparatus according to claim 28, wherein the object of interest is a face.

39. An apparatus for performing relighting on a digital image, comprising:
- a processor operably coupled to memory storing input image data which contains an object of interest and having at least one spurious edge directly resulting from a first illumination present when the input image was acquired, a model of a representative object of interest, and functional processing units for controlling image processing, wherein the functional processing units comprise:
- a model generation module;
- a model based anisotropic diffusion module which predicts edge information regarding the object of interest utilizing the model, and removes the first illumination to produce a reflectance image;
- a second illumination module which generates a second illumination; and
- a lighting application model which applies the second illumination.

40. The apparatus according to claim 39, wherein parameters of the model based anisotropic diffusion module are selected so that filtering is performed, utilizing the model's predicted edge information, whereby spurious edges are removed while leaving edges resulting from structures associated with the object of interest.

* * * * *